Feb. 11, 1941.  H. W. ALTORFER  2,231,651
POWER RESET WRINGER
Filed Nov. 21, 1938  8 Sheets-Sheet 2

Fig. 2.

Inventor:
Henry W. Altorfer
By Jefft + Jefft
Attys.

Fig. 4.

Feb. 11, 1941.　　　H. W. ALTORFER　　　2,231,651
POWER RESET WRINGER
Filed Nov. 21, 1938　　　8 Sheets-Sheet 5

Inventor:
Henry W. Altorfer
By: Jefft + Jefft
Attys.

Patented Feb. 11, 1941

2,231,651

UNITED STATES PATENT OFFICE 2,231,651

POWER RESET WRINGER

Henry W. Altorfer, Peoria, Ill.

Application November 21, 1938, Serial No. 241,516

6 Claims. (Cl. 68—253)

This invention relates to clothes wringers of the type usually found on domestic electric washing machines.

The rapid increase in the sale and use of domestic washers has naturally developed and accentuated their faults or imperfections. This has been particularly true of power wringers, and as wringers are actually used more by the operator than any other part of the machine, the need for safer, more effective and easier operated wringers has been urged by public demand.

The particular object of this invention is to provide a wringer mechanism that will perform all of its functions easily, quickly and safely, the release mechanism being independent of other mechanism and positive in action.

Another object is to provide a mechanism wherein certain safety operations, such as stopping rotation of the rolls when pressure is released, would be performed automatically.

A still further object is to provide mechanism wherein the manual resetting of pressure on the rolls in accomplished quickly and safely by power, thus making it easier and more convenient for the operator. The particular object of such mechanism is to encourage safety practices, such as releasing roll pressure when only slight hazards exist where otherwise the operator naturally might tend to take a chance rather than exert the necessary effort to reset pressure.

Another object is to combine with the foregoing objectives, power reset and safety roll stop mechanisms, all the conventional safety pressure release mechanisms, automatic shifting of drain boards and other wringer features in a wringer that is simple and sturdy in structure and that can be manufactured economically.

Other objects and benefits will be disclosed by the following descriptions and drawings in which.

Figure 1:
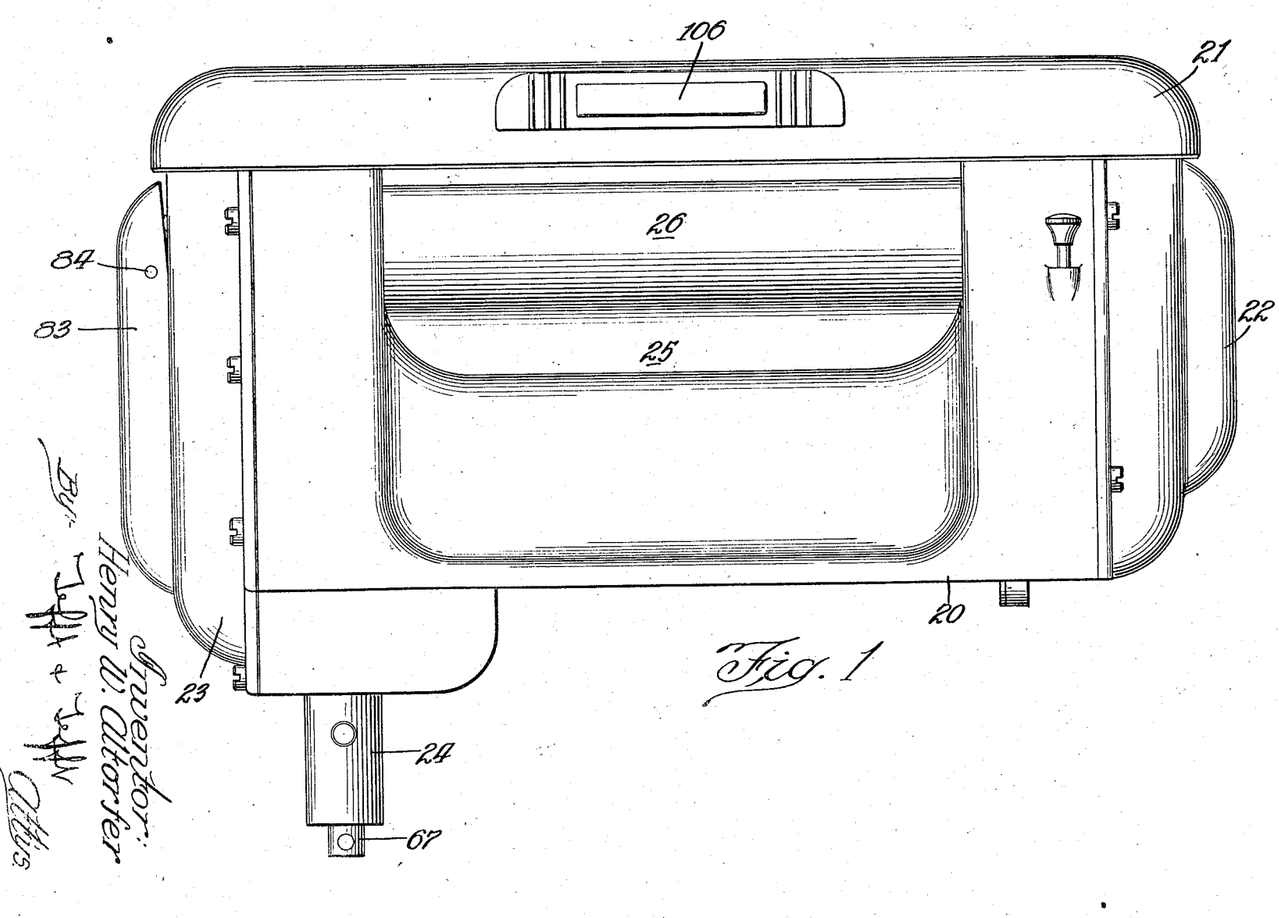
Fig. 1 is a front elevation view of my wringer complete.

Now referring to Fig. 1 of the illustrations, I designate the lower or main frame by the numeral 20 and the top frame, movable vertically upwards, by the numeral 21. The lower frame 20 is finished by end caps, the numeral 22 designating the outside end cap and the numeral 23 the inside end cap. Attached to the lower frame is a wringer post pivot casting 24, the attachment being best shown in Fig. 2.

Figure 2:
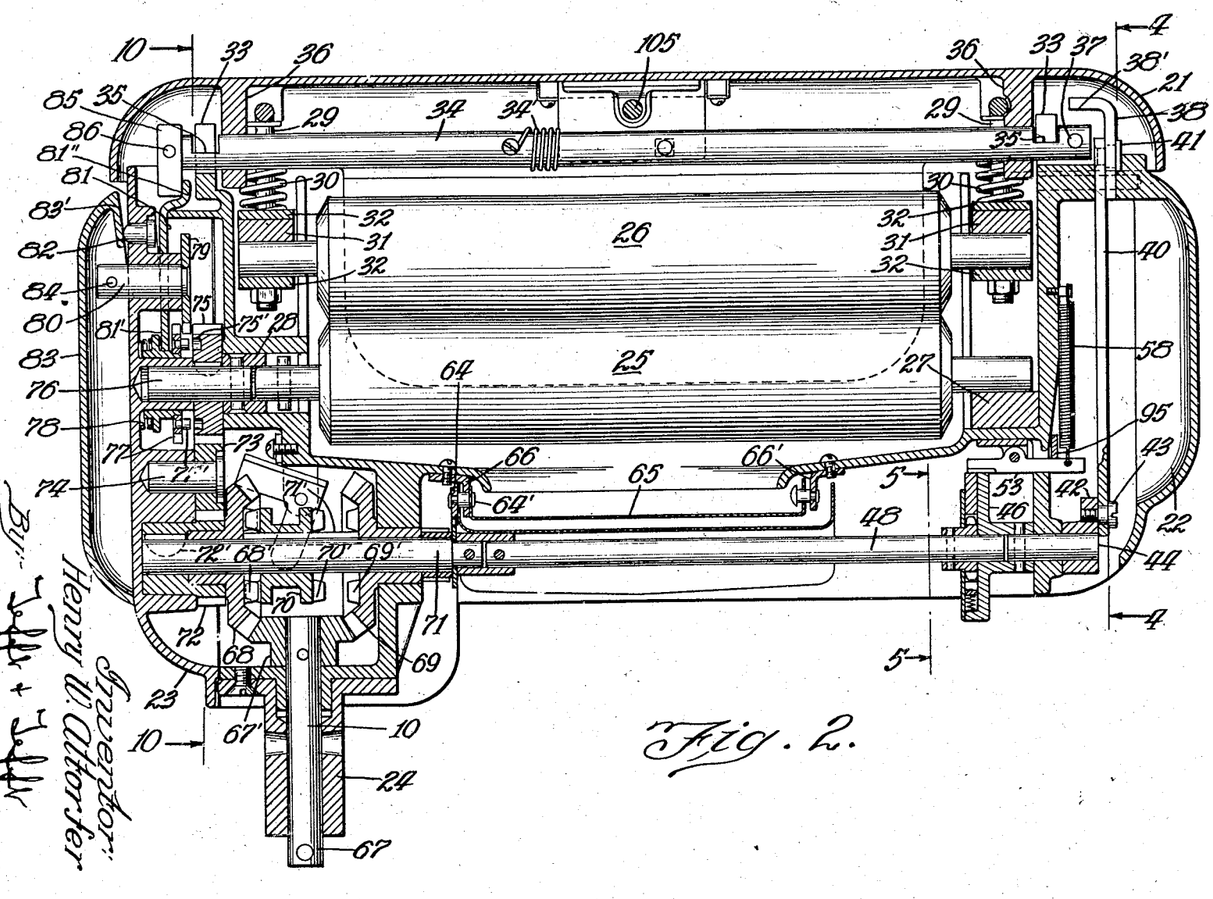
Fig. 2 is a similar view to Fig. 1 in longitudinal cross-section to better show the interior arrangement of the structure and parts.

Now referring to Fig. 2, I designate the lower roll as 25 and the upper roll as 26. The lower roll is journaled in outside bearing 27 being a plain bearing, and the inside bearing 28 being in the nature of a conventional cylindrical coupling.

The top roll 26 is carried on U-bolts 29 attached to the upper frame 21. The bearings 31 for the upper roll are carried in cross-support members 32 slidably mounted on the U-bolts 29 and urged downwardly by the springs 30.

The top frame 21 is attached to the lower frame 20 by cam lugs 33 integral with the lower frame. A cam bar 34 has cam slots 35 co-acting with the cam lugs 33 and is rotatably mounted in the top frame 21 in bearing lugs 36.

Figure 4:
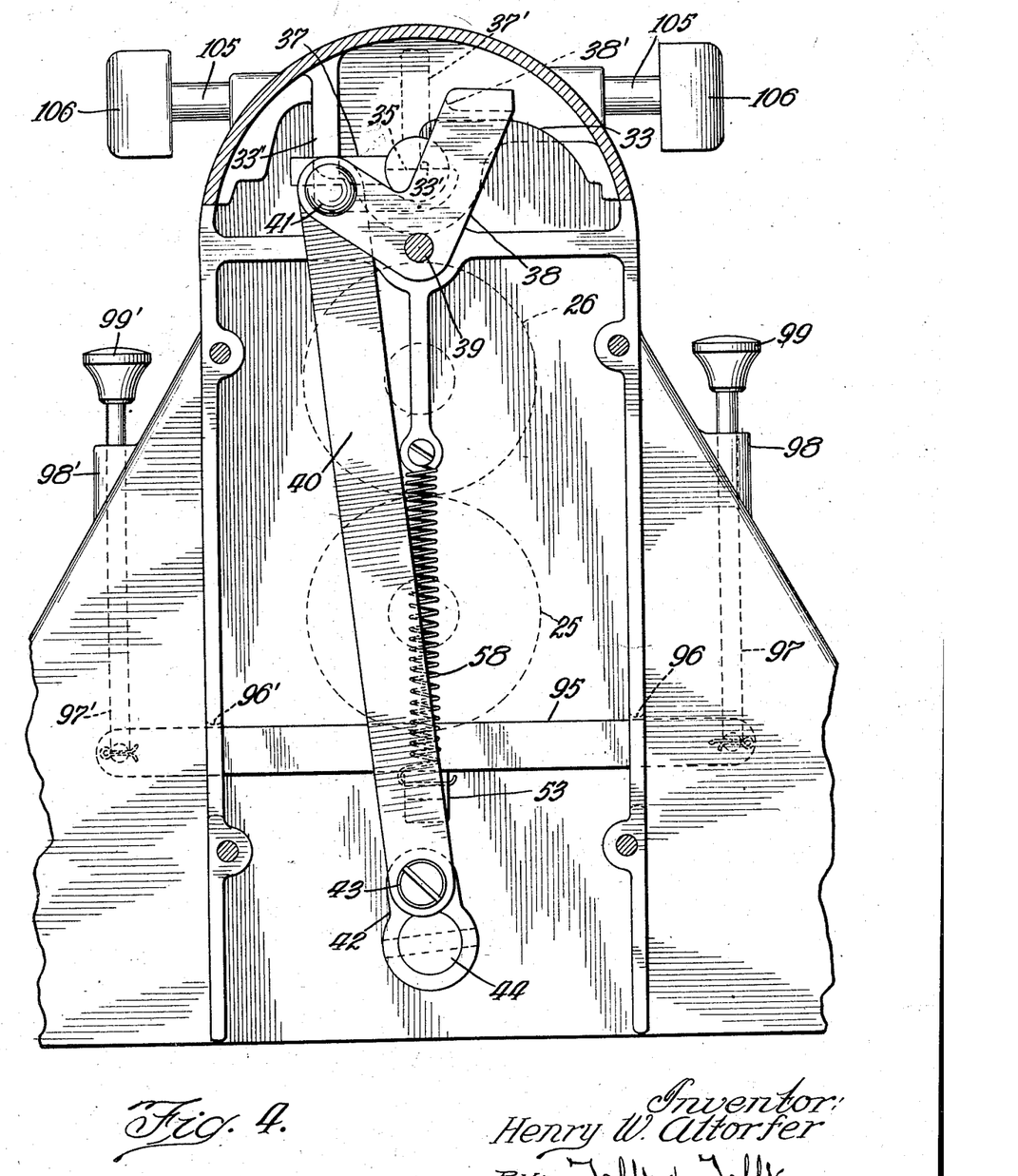
Fig. 4 is an enlarged broken end elevation view on the section line 4—4 of Fig. 2, showing parts of the power reset mechanism.

Referring to Figs. 2 and 4, it will be noted that the cam bar 34 has a lever pin 37 inserted in its outer end. By means of this lever pin the cam bar 34 is rotated approximately 90°, the two extreme positions being shown in Fig. 4, one in full and the other in dotted outline 37'. Co-acting with this lever pin 37 is a bell crank member 38 which has an inwardly projecting extension 38' to contact the pin 37. On the opposite arm of the bell crank 38 is attached a link arm 40 by means of a shoulder rivet 41. The lower end of this connecting link 40 is attached to a crank member 42 rotatably mounted on a shaft 44 journaled in the lower end of the main frame. This crank 42 attaches to the connecting link 40 by shoulder screw 43. It will readily be appreciated that upon rotation of the crank 42 the bell crank 38 is oscillated through an arc of approximately 90° and by contact with the lever pin 37 such movement will rotate the cam bar 34 through an arc of approximately 90° which by co-action of the cam slots 35 in the cam lugs 33' urges the top frame 21 downward into normal operating position with the lower frame.

Figures 5, 6, 7, 8, 9:
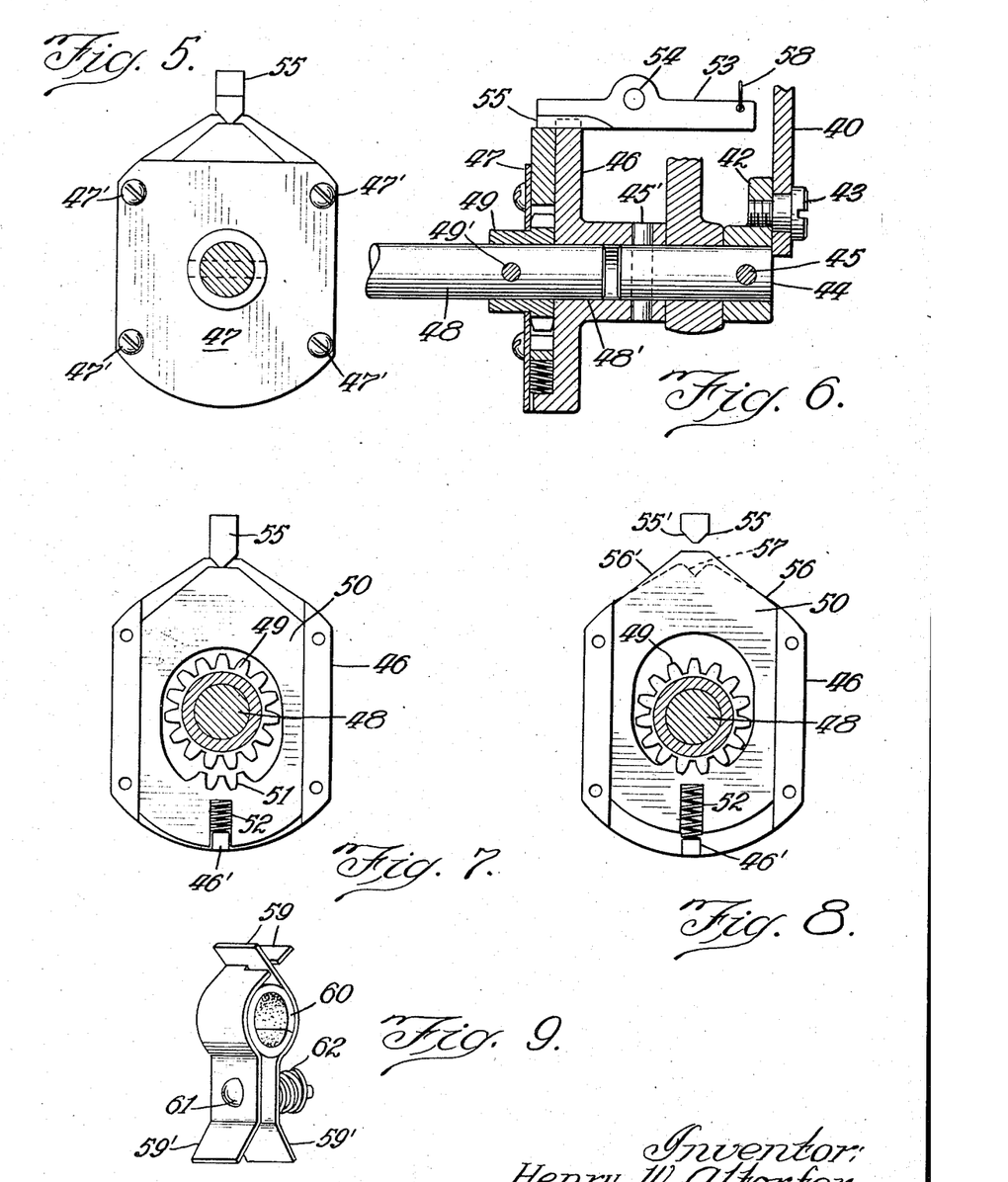
Fig. 5 is an enlarged end elevation view of the power reset clutch as it appears from the line 5—5 of Fig. 2.
Fig. 6 is an enlarged side longitudinal section of the same power reset clutch and crank mechanism as shown in Fig. 2.
Fig. 7 is a view of the power reset clutch similar to that shown in Fig. 5 with the cover plate removed to show the clutch parts in separated or free position.
Fig. 8 is a similar view to Fig. 7 but showing the parts in clutched or closed position as actuated by the compression spring when the detent lever is lifted.
Fig. 9 is an isometric view of the flipper board actuating dog.

Now referring to Figs. 5, 6, 7 and 8, it will be noted that the crank 42 is pinned to the shaft 44 by the pin 45. The opposite end of the shaft 44 is attached to the clutch housing 46 by pin 45'. This clutch housing 46 rotatably supports the outer end of the shaft 48 in the bearing 48', the shaft being held inwardly by a pinion 49 abutting the inner face of the clutch body 46 as held by the pin 49' through the shaft 48. Slidably mounted in the clutch body 46 is the clutch slide 50 with internal teeth 51 designed to co-act with the pinion 49 for engagement and disengagement as shown in Figs. 7 and 8. This clutch slide is urged upwardly by compression spring 52 supported on the boss 46' integral with the clutch body 46. Normally the spring 52 would hold the clutch slide 50 into engagement with the pinion 49 and thereby the shafts 48 and 44 would be attached, thus causing rotation of the crank member 42.

The clutch slide 50 is held in position in the clutch body 44 by the plate 47 attached by the screws 47'. Means is provided to throw out the slide member 50 from engagement with the pinion 49 as shown in Fig. 7 by the cam lever 53 pivotally mounted by the pin 54 on the frame 20. The cam lever 53 normally holds the clutch out of engagement by means of the spring 58 which holds the cam lever 53 downward as shown in Fig. 7. However, as will later be explained, means is provided to manually lift the cam lever 53, whereupon the slide 50 moves upward into engagement with the pinion 49 and the crank 42 is rotated. However, when this manual lifting of the cam lever 53 is released, it again returns to the position as shown in Fig. 7 and by means of the bevel cam faces 55 and 55' coming into contact with the bevel surfaces 56 and 56' of the slide 50, the slide is again driven downward into released position as shown in Fig. 7. It will thus be apparent that if the cam lever is momentarily released, the shafts 48 and 44 would rotate 360° and stop. Because the cam surfaces 55 and 55' and 56 and 56' are balanced on the center line of the slide 50, it will be obvious that this action will occur regardless of which direction the shaft 44 is rotated.

Now referring to Fig. 9 I illustrate an automatic actuating device for the drain flipper board. Exactly similar notched and formed steel strip members 59 are pivoted together through the notches at their upper end and urged together by the spring 62 held by the rivet 61. This lemon squeezer structure surrounding the split bearing 60 has the effect of maintaining this split bearing in friction contact with the shaft to cause rotation of the members 59, whereupon the opposite end 59' surrounding the actuating member of the flipper board causes the flipper board to be maintained in either of the extreme positions by means of the friction of the bearing 60 on the shaft. The bearing 60 is of the oil impregnated type to avoid excessive friction and squeaking, and inasmuch as the shaft is of relatively low rotational speed, this result is effectively accomplished.

Figure 3:
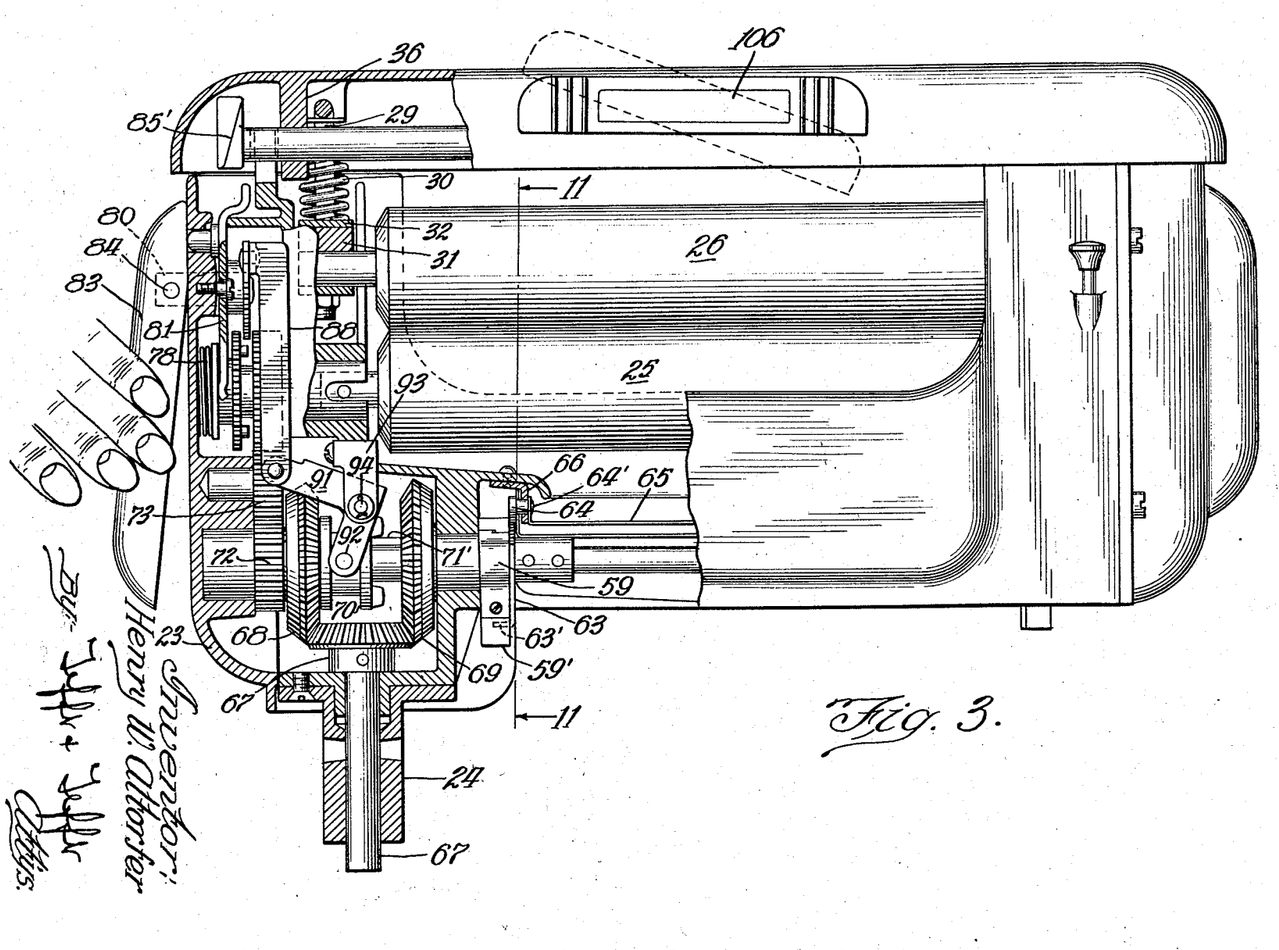
Fig. 3 is a broken front elevation view with the top frame on the lower frame but no pressure on the rolls at the start of the power reset operation.
Figures 11, 12:
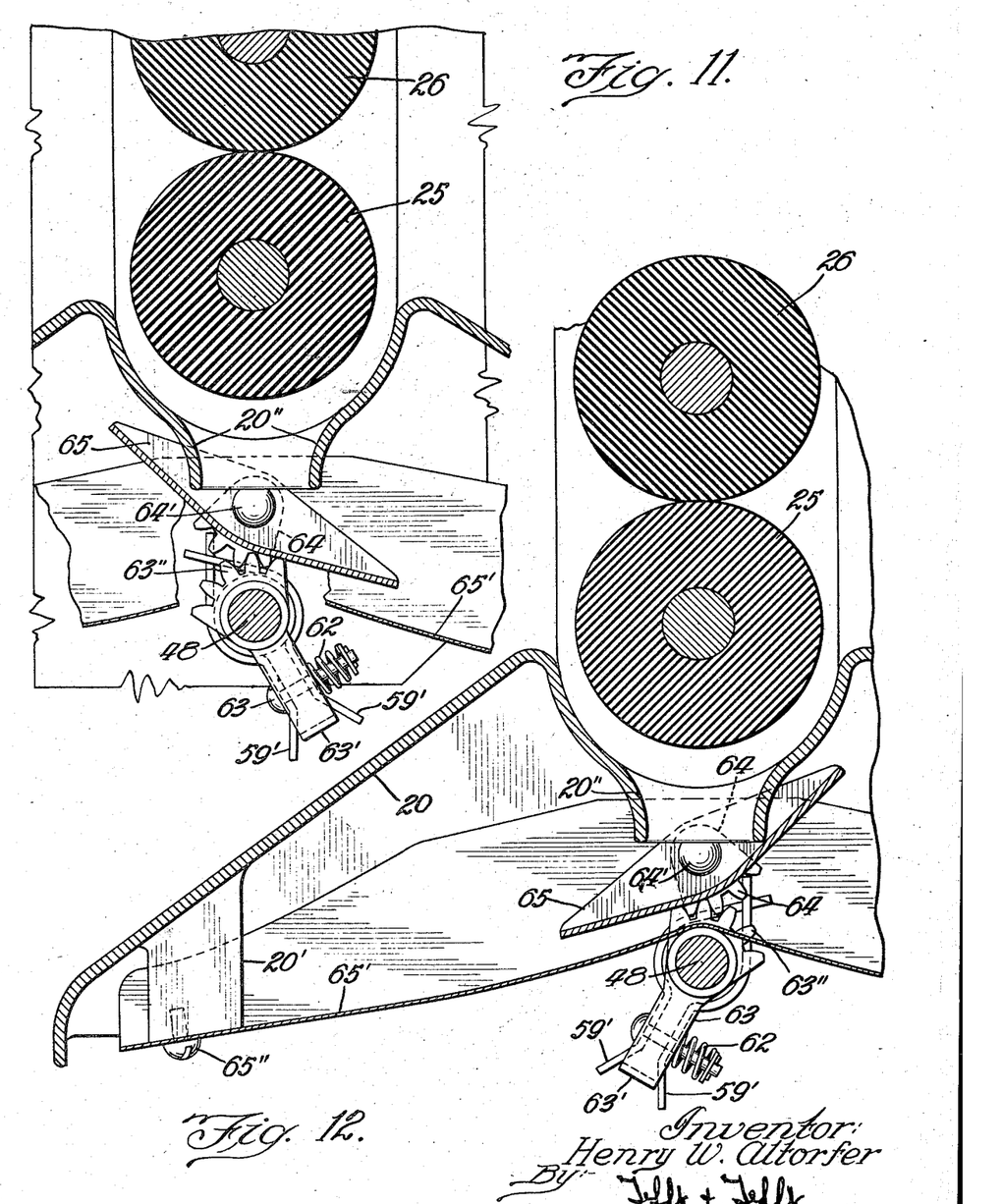
Fig. 11 is an enlarged cross-sectional view on the section line 11—11 of Fig. 3, showing the flipper board and flipper dog as they appear when the lower roll is rotating counterclockwise.
Fig. 12 is an exactly similar view to Fig. 11, showing the flipper board and flipper dog as they appear when the lower roll is rotating clockwise.

Referring to Figs. 11 and 12, it will be noted that a stamped steel segment gear member 63 is mounted on the shaft 71 as shown in Figs. 2 and 3. A tail 63' of this segment member 63 is imposed between the angular extensions 59' of the friction members 59 and as before explained, the lemon squeezer action on the members 69 on the bearings 60 will have the effect of rotating the segment member 63 as far as it will go in either direction, depending upon the clockwise or counter-clockwise rotation of the shaft 71. A companion segment gear member 64 is riveted to the flipper board 65 by the shoulder rivet 64'. This shoulder rivet is supported by bracket 66 which with the companion bracket 66' supports the flipper board 65. It will thus be seen that the flipper board is held in either of its two extreme positions and that drain water from the rolls 25 and 26 is directed through the funnel opening 20'' of the main frame 20, whereupon the flipper board will direct it to either side of the wringer by means of the sub-drain board 65' attached to the lower frame 20 by screws 65''. From the above description it will be apparent that I have provided an automatic means to direct the drain water to either side of the wringer as would properly be determined by the direction of rotation of the gear head shaft 71.

Figure 10:
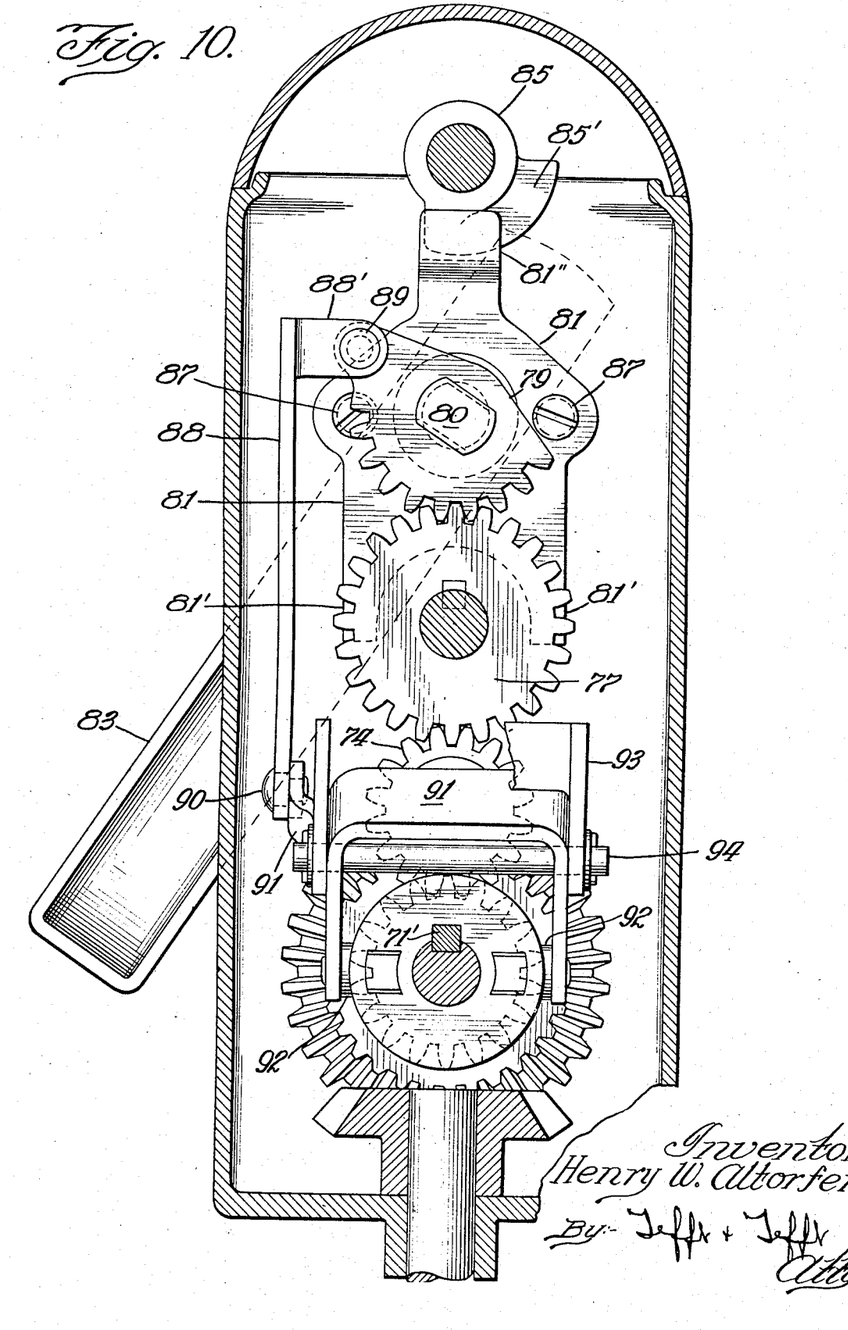
Fig. 10 is an enlarged end elevation view partly in section to reveal gear and gear shift mechanism as it appears on the section line 10—10 of Fig. 2.

Now referring to Figs. 2, 3 and 10, I will describe the drive mechanism enclosed in the inner end of the wringer. A stub shaft 67 is driven from the gear case as the wringer is mounted on the wringer support tube by means of the pivot casting 24. On the upper end of this stub shaft 67 is a bevel gear 67' fixed in place by a pin. The bevel gear 67' meshes permanently with mating gears 68 and 69 which revolve freely on the horizontal shaft 71. On the horizontal gears 68 and 69 are clutch lugs 68' and 69' for clutching engagement with similar lugs 70' on the clutch 70 slidably mounted but keyed to the shaft 71 by the key 71'. It will be understood that the rotation of the shaft 71 is reversed by sliding the clutch 70 from one gear to the other or stopped when clutch is in neutral. On the left end of the shaft 71 is a spur gear 72 keyed to the shaft 71 by the Woodruff key 72'. Meshing with the spur gear 72 is an idler gear 73 mounted for rotation on a shoulder stub shaft 74 supported in a boss of the end cap 23. Meshing with the idler gear 73 is another spur gear 75 keyed to a shaft 76 which is journaled in a bearing in the end cap 23 and fixed to the coupling 28 by a rivet. It will be apparent from this construction that the gear 75 and the shaft 76 are rotated through the train of gearing heretofore described. Around the boss of the journal 76 in the end cap 23 is mounted a clutch gear 77 having pins 77' for engagement in recesses 75' in the gear 75. This clutch gear 77 is urged inwardly into clutching engagement by compression spring 78 but is controlled by the clutch lever 81 rockably mounted on the frame 20 by the shoulder screws 87 as best shown in Fig. 10. Above the clutch gear 77, riveted to a stub-shaft 80, is the segment gear lever 79 which may be engaged and rotated by the clutch gear 77 when the clutch gear 77 is permitted to move inward into clutching engagement with the pinion 75. It will be noted on Fig. 10 that the clutch lever 81 has yoke fingers 81' which engage the shoulders of the clutch pinion 77 for controlling the movement thereof. The upper end of the clutch lever 81 is bent inward to provide a cam face 81" which engages with a cam 85 pinned to the cam rod 34 by the pin 86. In Fig. 3 the bevel face 85' of the cam 85 is best shown as it is before engagement with the cam face 81". From the above it will be apparent that the clutch lever 81 may be actuated by movement of the cam rod 34 and the cam 85. On the opposite end of the stub shaft 80 is a handle 83 pivotally attached to the shaft 80 by the pin 84. The upper end of this handle 83 has a beveled face 83' for engagement with a slidable button 82 designed to contact the clutch lever 81 when the handle is thrown outward, as best shown in Fig. 3. This action, as will be well understood, has the effect of declutching the clutch pinion 77, the object of which will later be explained.

Now referring to Figs. 10 and 3, it will be noted that the segment lever gear 79 riveted to the shaft 80 is pivotally attached to a link member 88 by means of a shoulder rivet 89. The lower end of the link 88 is similarly pivotally attached to a yoke lever 91 by means of the shoulder rivet 90. The yoke lever 91 has round pins 92 attached to the inside surface for contact with the flanges of the clutch member 70. The yoke lever 91 is pivotally mounted on a bracket 93 by the pin 94 and the bracket 93 is attached to the lower frame member 20 by screws, as shown best in Fig. 3. From the above construction it will be apparent that when the segment lever 79 is rotated by the clutch pinion 77, the yoke lever 91 will be rotated and the yoke pins 92 will move the clutch 70 out of engagement with the clutch lugs in the gears 68 or 69, thus providing power means to stop rotation of the rolls by disengagement of the clutch 70. It further will be apparent that the clutch 70 may be moved at the will of the operator for rotation in either forward or reverse direction by means of the handle which normally is attached to the segment lever 79 and thus provides manual means for reversing rotation of the rolls or for putting the clutch in neutral position. It will be obvious that when the segment lever 79 is rotated by the clutch pinion 77 that the only action which will result is the declutching of the mechanism because all movement will stop when the clutch 70 reaches neutral position.

I have previously described how by tripping the cam lever 53, the clutch enclosed in the clutch body 46 on the shaft 48 is engaged to rotate the shaft 44 and the crank 42 one revolution.

Now referring to Fig. 4, I will explain how the cam lever 53 is tripped. Through openings in the frame 20, a cross bar 95 is inserted, urged upwardly by the spring 58 against the top edges 96 and 96' of the opening. Extending vertically from the cross bar 95 are trip rods 97 and 97' extending through openings in the frame through bosses 98 and 98'. Trip buttons 99 and 99' finish off the end of the trip rods. It will readily be understood that when the operator depresses the button 99, the rod 97 acts on the cross bar 95 using the edge 96' of the opening 96 as a fulcrum and depresses the cam lever 53, whereupon the clutch is released and the crank 42 is revolved one revolution, the clutch again being thrown out by the cam lever 53 when the cross bar 95 is returned by the spring 58 to its original position. It will be appreciated that when the operator is on the opposite side of the wringer, the mechanism will work in reverse.

Figure 16:
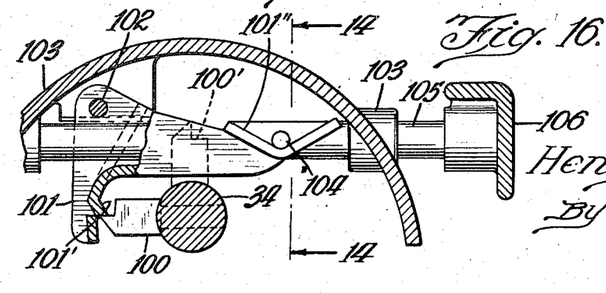
Fig. 16 is a sectional end elevation view of the release mechanism on the section line 16—16 of Fig. 13.

Now referring to Figs. 13, 14, 15 and 16, I will now describe the safety release mechanism employed in my wringer. By referring again to Fig. 4 it will be noted that the cam shaft 34 is held under the cam boss 33' in unstable equilibrium. When pressure is exerted between the rolls and the top frame 21 urged upwardly, the cam bar 34 would naturally tend to rotate clockwise as shown in Fig. 4. This clockwise rotation is resisted by a latch dog 100 inserted in cam bar 34 as shown in Fig. 16. The latch dog 100 is held in locked position by a latch member 101 under the latch shoulder 101', which is pivoted from the top frame 21 by the pin 102. Extending outwardly from the pivot 102 as a bell crank are dual arms having cam faces 101". These dual arms straddle a cross bar 105 extending through bosses 103 and finished by operating trip bars 106. Through the rod 105 extends a pin 104 which bears on the cam surfaces 101'. The latch member 101 is resiliently held in position to permit the latch dog 100 to be engaged by the latch 101' by a torsion spring 34' attached to the cam bar 34 by a screw 34", the opposite end being hooked under the latch member 101 as shown best in Fig. 13.

It will readily be appreciated that when the trip bars 106 are actuated transversely, the pin 104 bearing against the cam faces 101" will have the effect of rotating the latch member 101 clockwise as shown in Fig. 16, and thus release the dog 100 and the shaft 34 for clockwise rotation and thus release the top frame from the lower frame and relieving all pressure between the rolls.

Figures 13, 14, 15:
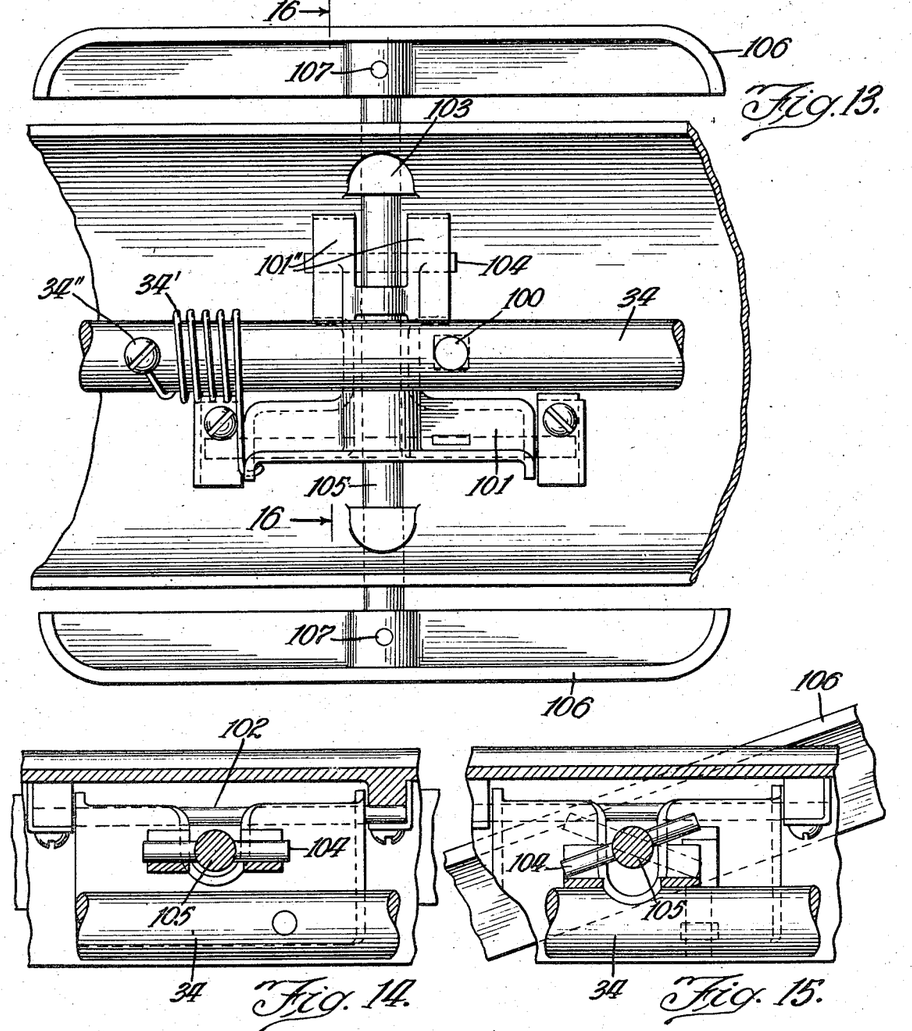
Fig. 13 is an enlarged plan view of the safety release mechanism as it appears in reverse position or upside down.
Fig. 14 is an enlarged sectional elevation view of the safety release mechanism in normal position on the section lines 14—14 of Fig. 16.
Fig. 15 is an exactly similar view to Fig. 14, showing the actuation of the release mechanism when the release handle is rotated as shown in dotted outline in Fig. 1.

Likewise as shown in Fig. 15, if the trip bar 106 is rotated in either direction, the end of the pin 104 will again depress the lever 101 to release the dog 100 and all roll pressure. It will thus be understood that I have provided a safety release mechanism which will release all pressure between the rolls by any transverse or rotational movement of the trip bar 106 and further that this mechanism is independent of all other mechanism, positive in action, and permits the rolls to be completely separated without limitation.

Operation

Having thus described the structure of my wringer and the functional relationship of its parts, I will now describe its operation.

Assuming the wringer in operation as shown in Figs. 1 and 2, by moving the trip bar 106 either transversely or pivotally the latch dog 100 is released and the cam bar 34 rotates 90°, releasing the cam surface 35 from under the cam lug 33' and permitting the top frame 21 to move upward and the rolls 25 and 26 to be separated.

As the cam bar 34 rotates 90°, the cam 35 on the inner end of the cam bar 34 releases the extension 81″ of the clutch lever 81 by the cam face 85′. The clutch lever 81 is now free and permits the spring 78 to push the clutch pinion 77 inward into mesh with the segment lever 79, whereupon the pin 77′ engages in the hole 75′ of the gear 75 and rotates the segment lever 79 which disengages the clutch 78 by means of the lever mechanism 88, 91, 92, 93 and 94, thus stopping the rotation of the roll.

It will be appreciated from the above that I have thus provided a roll pressure release and roll stop, essential safety devices, made reliably effective because the roll pressure itself actuates the release of the cam bar 34 and the clutch 78 is released by power through gearing.

Now assuming the upper frame separated from the lower frame as shown in Fig. 3, and desiring now to put the wringer in operating position, it will be appreciated that the bent end extension 81″ of the clutch lever 81 is held outward into the path of the cam 85 because the clutch pinion 77 was left in inward engaged position with the gear 75 and the segment lever 79. To clear this interference, the operator pulls the handle 83 outward as shown in Fig. 3, and this clears the extension 81′ by pushing the button 82 inward against the trunnion lever 81 and permits the top frame and cam bar to be placed in proper relation to the lower frame so that it may again be set in pressure relationship.

The operator now rotates the handle 83 in the desired direction and manually engages the clutch 78 with either of the gears 68 or 69 and by merely touching either of the buttons 99 or 99′, the clutch body 46 and crank 42 are rotated one revolution. The bell crank 38 thereupon is oscillated 90° and the angular extension 38′ engages the pin 37, rotating the cam bar 34 90° and forcing the cam surface 35 under the lug 33′ which is held by the latch dog 100 and the release mechanism 101 to 106. Thus the top frame is cammed downward and the rolls again set in pressure relationship.

It will be appreciated that the top roll must practically be in contact with the lower roll before my power reset mechanism can be made to function. I have thus prevented any possibility of injury to an operator's hands or fingers as they might carelessly be placed between the rolls when the power reset mechanism is tripped to function and the rolls forced together. I have thus provided a power reset mechanism which can be operated safely with a minimum of physical effort.

Having thus described my invention, I claim:

1. In a wringer, a lower frame, a separable top frame, guides and cam lugs on the lower frame for attaching the top frame, reversing drive gears in the lower frame, an oscillating power lever mounted in the lower frame operable by said drive gears, a one revolution trip clutch mechanism connecting said drive gears and power lever, a lower roll journaled in the lower frame, a roll spring-mounted in journals from said top frame, a rotatable cam bar and co-acting cam surfaces in the top frame operable by said power lever, manual means to trip said one revolution clutch mechanism, and means whereby the cam bar is rotated and the top frame and roll cammed downward into roll pressure relationship on the lower frame.

2. In a wringer, a lower frame, a separable top frame, guides and cam lugs on the lower frame for attaching the top frame, reversing drive gears in the lower frame, a lower roll journaled in the lower frame, spur gears driven by said reversing gears to drive the lower roll, a clutch controlling the direction of rotation or to stop rotation of said drive gears, a roll spring-mounted in journals in the top frame, a cam bar in the top frame said bar having a plurality of cam surfaces, some cooperating with said cam lugs and said bar being rotatable in one direction to cam the top frame and roll downward into pressure relationship on the lower roll and by reverse rotation to release the top frame and roll pressure, a clutch pinion operable to engage the spur gears driving the lower roll, a clutch lever controlling said clutch pinion by co-action with one of the cam surfaces on the cam bar, and mechanism driven by said clutch pinion to move the clutch of the reversing gears to neutral or stopped position whereby the rotation of the lower roll is stopped when roll pressure is released.

3. In a clothes wringer, a lower frame, a separable top frame, a pair of cooperative rolls, a reversible gear mechanism in the lower frame, cam mechanism co-acting between the frames to force the frames and rolls together into pressure relationship, clutch mechanism controlling the action of the cam mechanism, and a manual means to trip said clutch mechanism, whereby the cam mechanism forces the top frame downward and the rolls into pressure relationship.

4. In a clothes wringer, a lower frame, a separable top frame, a pair of cooperative rolls, reversible gear mechanism including a clutch to control the direction of rotation or to stop rotation of the rolls, cam bar mechanism in the upper frame to cam the frames and rolls together in pressure relationship and by reverse movement to release the pressure, and power means controlled by the movement of said cam bar mechanism, whereby when roll pressure is released, the clutch in the reversible gear mechanism is moved to stop rotation of the rolls.

5. In a clothes wringer, cooperative and separable upper and lower frame members, a pair of wringer rolls, reversible gear mechanism in the lower frame, power means cooperatively associated between the frames to cam the frames together and to force the rolls into pressure relationship, and a manually controlled clutch co-acting between the reversible gear and the power means whereby the operator may trip the clutch and cause the rolls to be set in pressure relationship.

6. In a clothes wringer, cooperative and separable upper and lower frame members, a pair of wringer rolls, reversible gear mechanism in the lower frame including a clutch to control direction of rotation or to stop rotation of the rolls, cam mechanism to hold the frames and rolls together in pressure relationship or to release the pressure, and power means driven by said reversible gear mechanism and controlled by said cam mechanism whereby the clutch in the reversible gear mechanism is moved to neutral or stopped position when the roll pressure is released.

HENRY W. ALTORFER.